(12) United States Patent
Bailey et al.

(10) Patent No.: US 8,626,768 B2
(45) Date of Patent: Jan. 7, 2014

(54) AUTOMATED DISCOVERY AGGREGATION AND ORGANIZATION OF SUBJECT AREA DISCUSSIONS

(75) Inventors: Peter Richard Bailey, Kirkland, WA (US); Daniel Robert Schwartz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 12/683,078

(22) Filed: Jan. 6, 2010

(65) Prior Publication Data

US 2011/0167054 A1 Jul. 7, 2011

(51) Int. Cl.
*G06F 7/00* (2006.01)
*G06F 17/30* (2006.01)

(52) U.S. Cl.
USPC ........................................................ 707/738

(58) Field of Classification Search
None
See application file for complete search history.

(56) References Cited

U.S. PATENT DOCUMENTS

| | | |
|---|---|---|
| 2007/0214097 A1 | 9/2007 | Parsons |
| 2008/0034058 A1 | 2/2008 | Korman |
| 2008/0097843 A1 | 4/2008 | Menon |
| 2008/0281622 A1 | 11/2008 | Hoal |
| 2008/0288347 A1 | 11/2008 | Sifry |
| 2009/0012971 A1 | 1/2009 | Hunt |
| 2009/0171686 A1 | 7/2009 | Eberstadt |
| 2009/0259632 A1 | 10/2009 | Singh |

FOREIGN PATENT DOCUMENTS

WO WO2008113425 A1 9/2008

OTHER PUBLICATIONS

Zanardi et al., "Social Ranking: Uncovering relevant Content Using Tag-based Recommender Systems", RecSys '08, pp. 51-58, ACM, 2008.*
Pons-Porrata et al., "Topic discovery based on text mining techniques", Information Processing & Management, vol. 43, Issue 3, May 2007, pp. 752-768, Elsevier Ltd.*
Cao et al., "Context Aware Query Suggestion by Mining Click-Through and Session Data", KDD'08, pp. 875-883, Aug. 2008, ACM.*
Bruns et al., Locating the Australian Blogosphere: Towards a New Research Methodology, ISEA 2008 Conference, Jul. 2008.*
Xue et al., "Optimizing Web Search Using Web Click-through Data", CIKM '04, pp. 118-126, 2004, ACM.*
Mislove et al., "Exploiting Social Networks for Internet Search", Record of the 5th Workshop on Hot Topics in Networks, Hot Nets V, Session 5, pp. 79-84, ACM, 2006.*

(Continued)

*Primary Examiner* — Michael Hicks
(74) *Attorney, Agent, or Firm* — Shook Hardy & Bacon LLP (57) ABSTRACT

An aggregation service aggregates discussions of events and topics within a given subject area using seed search queries, seed URLs, and/or search engine data. A subject area is selected and a set of seed search queries and/or seed URLs relevant to that subject area are manually generated. The set of seed search queries and/or seed URLs are used to identify URLs containing content relevant to the subject area. The URLs are crawled at given intervals to identify content items, which are analyzed using a classifier to identify content items relevant to the subject area. The content items are grouped into clusters surrounding events and/or topics within the subject area. The various clusters are ranked against one another to facilitate ordering clusters for presentation to end-users.

20 Claims, 4 Drawing Sheets

(56) References Cited

OTHER PUBLICATIONS

Gomez et al., "Statistical Analysis of the Social Network and Discussion Threads in Slashdot", WWW 2008, Refereed Track: Social Networks & Web 2.0—Analysis of Social Networks & Online Interaction, pp. 645-654, ACM, 2008.*

Catone, Josh, 6 Ways to Filter Your RSS Feeds—Published Date: Mar. 4, 2008 http://www.readwriteweb.com/archives/6_ways_to_filter_your_rss_feeds.php#.

Aggregate Feeds—Published Date: Oct. 13, 2004 http://intertwingly.net/wiki/pie/AggregateFeeds.

Azure Feeds—Retrieved Date: Nov. 5, 2009 http://azurefeeds.com/About.aspx.

* cited by examiner

AUTOMATED DISCOVERY AGGREGATION AND ORGANIZATION OF SUBJECT AREA DISCUSSIONS

BACKGROUND

Users are often interested in specific subject areas and would like in-depth coverage of discussions of events and topics within those subject areas. However, it is often difficult for users to quickly find such information. In some cases, users may attempt to employ search engines to search for discussions of events and topics within given subject areas. This requires the user to submit a search query to the search engine to receive search results. Often, the search engine returns a large number of documents or web page addresses, and the user is then left to sift through the list of documents, links, and associated information to discover discussions of events or topics within the subject area. This process can be cumbersome, frustrating, and time consuming for the user, and as a result, is an ineffective way for users to discover discussions of events and topics within the subject areas of interest.

There are currently a number of services that aggregate discussions of events and topics by subject area. For instance, news verticals such as the BING news vertical and GOOGLE news vertical, aggregate news stories around given events into clusters, allowing users to view different discussions of particular news events. However, current aggregation services are generally very limited in scope, covering only a single subject area or a limited number of subject areas. For example, subject areas are high level such as politics, sports, sci/tech. Additionally, current aggregation services often require a large amount of human effort from an editorial staff that is responsible for developing and facilitating the aggregations provided by such aggregation services. Alternatively, some current aggregation services draw from existing news services which have received equivalent human editorial effort.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to an aggregation service that clusters web discussions of events and topics within a subject area based on a set of seed search queries and leveraging search engine data. In embodiments, an editorial staff of the aggregation service selects a particular subject area and develops a set of seed search queries, which may be a small set of search queries that the editorial staff believes to be relevant to the particular subject area. Additionally or alternatively, the editorial staff identifies a set of seed URLs, which correspond with documents the editorial staff believes to be relevant to the particular subject area. If a set of seed queries is provided, the set of seed search queries is used in conjunction with search engine data to identify a list of uniform resource locators (URLs) that are relevant to the subject area. If a set of seed URLs is provided, related URLs may be algorithmically determined to identify additional URLs relevant to the particular subject area. The identified URLs (and in some embodiments, URLs linked to and from those URLs) are crawled at given intervals to identify content items, each content item corresponding with a discussion of an event or topic from a crawled URL. The content items are analyzed using a classifier to identify content items that are relevant to the subject area and to filter out content items that are not relevant to the subject area. The relevant content items are then grouped into clusters of content items. Each cluster includes discussions surrounding a given event or topic within the subject area. The various clusters are also ranked to facilitate the order in which the events are presented to end-users. The above-noted process may be performed for a variety of different subject areas. End-users may access the aggregation service and select a particular subject area of interest. When an end-user selects a particular subject area, clusters of discussions of events and/or topics within the selected subject area are presented to the end-user.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide an aggregation service that operates to cluster discussions around events and topics within a given subject area using a set of seed search queries and/or set of seed URLs. Accordingly, one embodiment of the present invention is directed to one or more computer storage media storing computer-useable instructions that, when used by one or more computing devices, cause the one or more computing devices to perform a method. The method includes receiving an initial set of search queries including input search queries having been manually determined to be relevant to a given subject area. The method also includes generating an expanded set of search queries by analyzing search engine session data to identify additional search queries related to the input search queries, the expanded set of search queries including the input search queries and the additional search queries. The method further includes employing the expanded set of search queries to identify URLs relevant to the given subject area and periodically crawling documents associated with the URLs to provide content items from the URLs. The method also includes employing a classifier to identify relevant content items, the relevant content items being determined by the classifier to be relevant to the given subject area. The method further includes clustering the relevant content items into clusters, each cluster including a group of content items associated with a particular event or topic within the given subject area, wherein clustering is performed based at least in part on hyperlinking among the relevant content items. The method further includes ranking the clusters against one another, wherein the clusters are ranked based at least in part on presence of hyperlinking from social network sites to URLs corresponding with the relevant content items. The method still further includes generating a user interface allowing a user to view and interact with the clusters.

In another embodiment of the present invention, an aspect is directed to one or more computer storage media storing computer-useable instructions that, when used by one or more computing devices, cause the one or more computing devices to perform a method. The method includes receiving a plurality of seed search queries and/or seed URLs manually determined by an administrator of an aggregation service to be relevant to a given subject area. The method also includes identifying a plurality of URLs based at least in part on the plurality of seed search queries and/or seed URLs and crawling documents corresponding with the URLs to identify content items from the documents relevant to the given subject area. The method further includes clustering the content items into clusters. The method still further includes ranking the clusters against one another.

A further embodiment of the present invention is directed to a method performed by one or more computing devices to identify and cluster web discussions that are relevant to a selected subject area. The method includes identifying, by a first computing process, web pages relevant to the selected subject area based on search queries manually determined to be relevant to the selected subject area. The method also includes identifying, by a second computing process, discussions on the web pages that are relevant to the selected subject area. The method further includes clustering, by a third computing process, the discussions into clusters, each cluster including a group of discussions regarding a particular topic or event. The first, second, and third computing processes are performed by the one or more computing devices.

Figure 1:
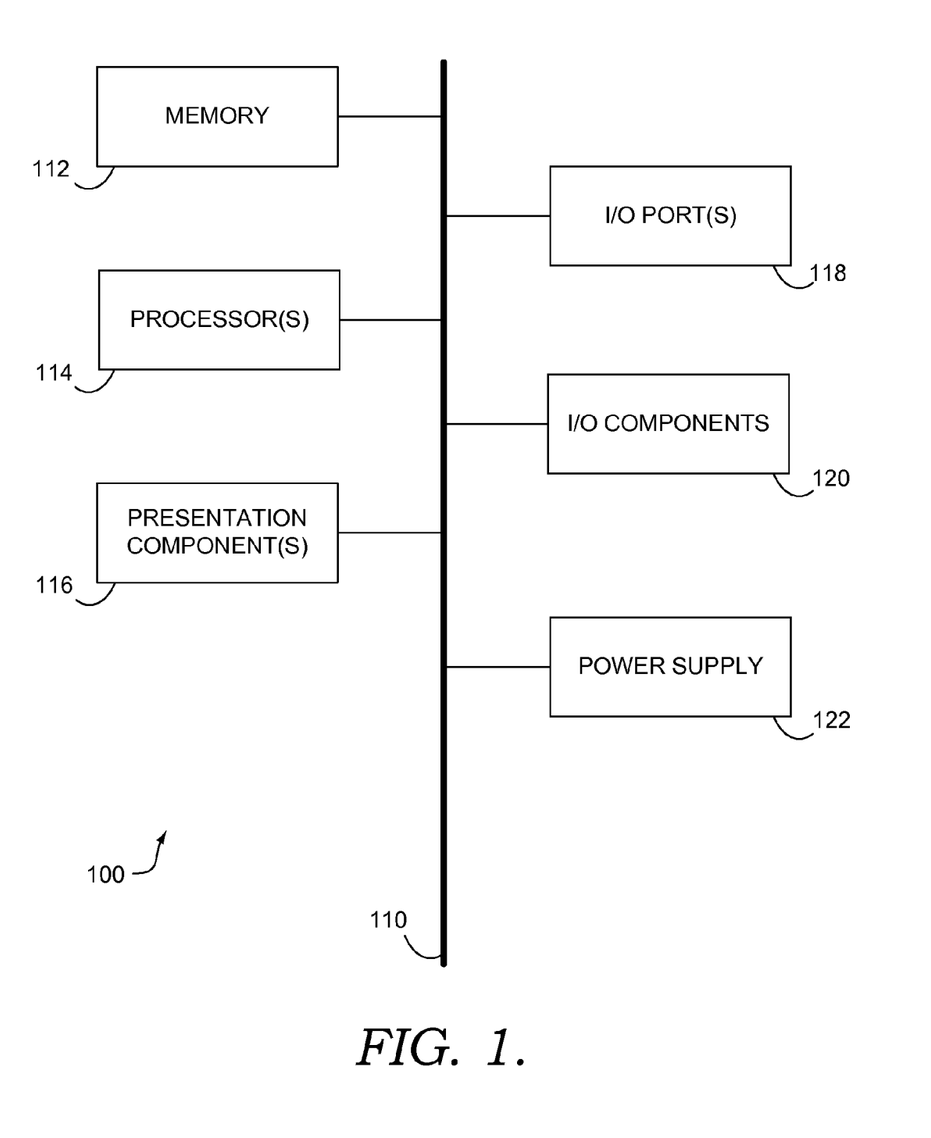
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
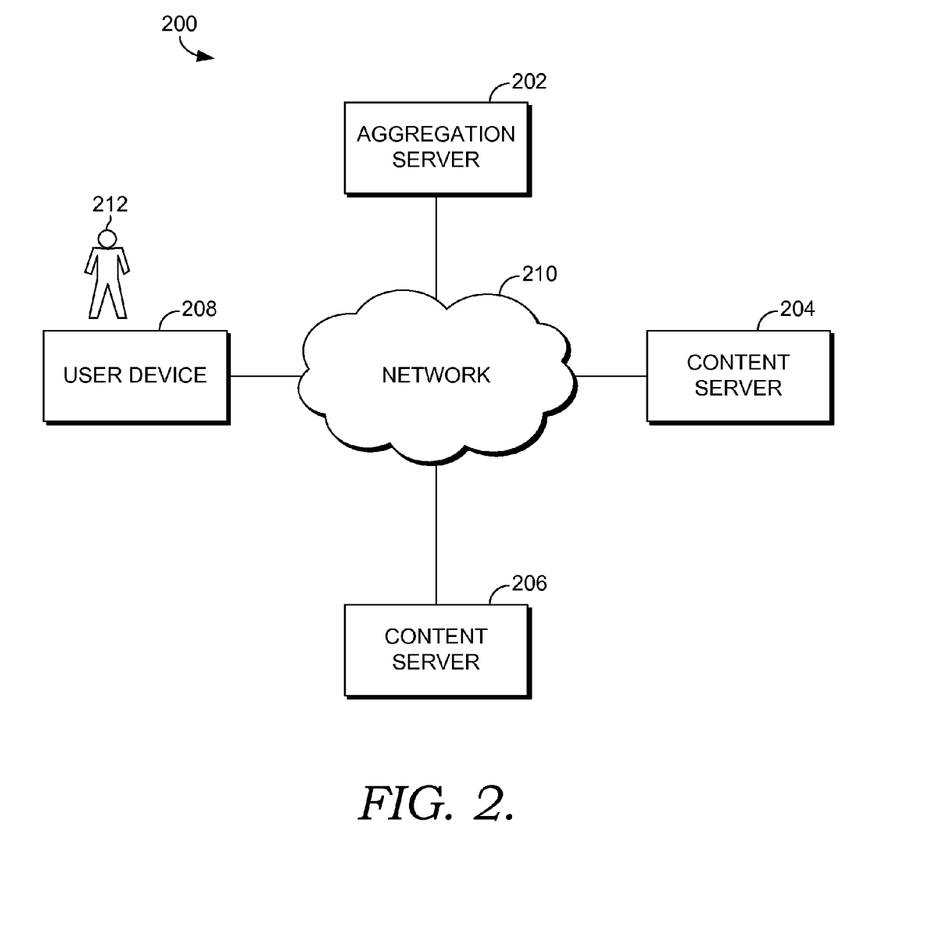
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include an aggregation server 202, content servers 204, 206, and a user device 208. Each of the components shown in FIG. 2 may be any type of computing device, such as computing device 100 described with reference to FIG. 1, for example. The components may communicate with each other via a network 210, which may include, without limitation, one or more local area networks (LANs) and/or wide area networks (WANs). Such networking environments are commonplace in offices, enterprise-wide computer networks, intranets, and the Internet. It should be understood that any number of aggregation servers, content servers, and user devices may be employed within the system 200 within the scope of the present invention. Each may comprise a single device or multiple devices cooperating in a distributed environment. For instance, the aggregation server 202 may comprise multiple devices arranged in a distributed environment that collectively provide the functionality of the aggregation service described herein. Additionally, other components not shown may also be included within the system 200.

Content servers, such as the content servers 204 and 206, may maintain a variety of content such as web pages. For example, the content servers 204 and 206 may each be a web server that maintains multiple web pages. Generally, the system 200 illustrates an environment in which the aggregation server 202 crawls content of web pages stored on content servers, such as the content servers 204 and 206, and aggregates content according to given subject areas.

By accessing and aggregating content from various content servers, the aggregation server 202 may provide aggregated content to user devices, such as the user device 208. In particular, a user 212 may employ a web browser or other mechanism on the user device 208 to communicate with the aggregation server 202. For instance, a user may view content that has been aggregated according to particular subject areas. The content may be provided in a number of different clusters. In embodiments, each cluster includes a grouping of content that has been identified to be directed towards a particular event or topic in the real-world.

Figure 3:
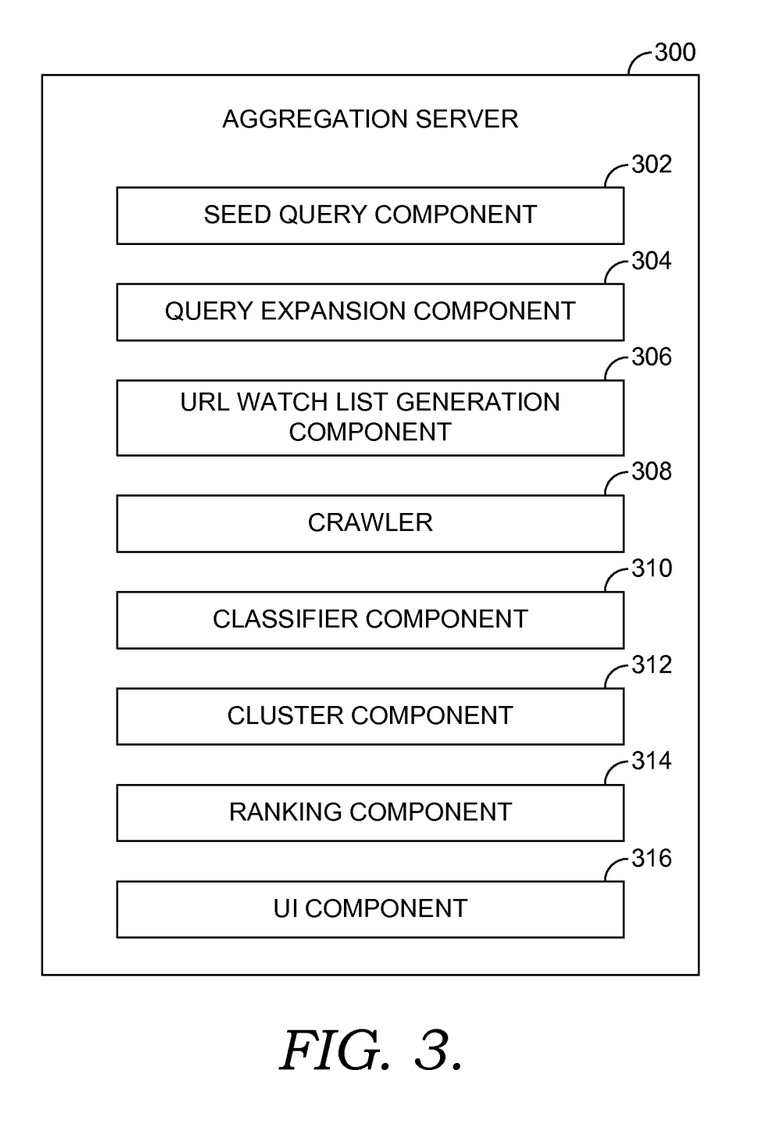
FIG. 3 is a block diagram of an exemplary aggregation server in accordance with an embodiment of the present invention.

Referring now to FIG. 3, an exemplary aggregation server 300 in accordance with an embodiment of the present invention will be described in further detail. Among other components not shown, the aggregation server 300 may include a seed query component 302, a query expansion component 304, a URL watch list generation component 306, a crawler 308, a classifier component 310, a cluster component 312, a ranking component 314, and a user interface component 316. Each component may comprise a program, routine, application, or other machine-executable code capable of performing the actions discussed herein. One skilled in the art will recognize that the components shown in FIG. 3 are provided for illustrative purposes only and other arrangements may be provided in accordance with various embodiments of the present invention. As noted above, the aggregation server 300 may comprise a single computing device, although it's likely that the aggregation server 300 would be implemented via multiple computing devices in a distributed computing environment.

Generally, the aggregation server 300 uses a set of seed search queries manually determined to be relevant to a given subject area to identify and aggregate content about that given subject area. The aggregation server 300 includes a seed query component 302 that operates to receive a set of seed search queries from an administrator/editorial staff associated with the aggregation service. In operation, editorial staff associated with the aggregation service provided by the aggregation server 300 chooses a subject area of interest. Additionally, the editorial staff determines a set of seed queries that the staff believes would cover the subject area of interest. For example, the editorial staff may decide to create an aggregation surrounding "soccer" as the subject area and may generate the following search queries as the set of seed search queries: {soccer}, {world cup}, {fifa}, {major league soccer}, {UEFA champions league}, {English premier league}, {football soccer}, and {soccer rules}.

In embodiments, the set of seed queries may include a small number of search queries. For instance, in some embodiments, the set of seed queries may include 10 or fewer search queries. In some embodiments, the set of seed queries may include a single search query.

The query expansion component 304 operates on the set of seed queries to identify an expanded set of search queries. For instance, the query expansion component 304 may employ the set of seed queries that includes 10 or fewer search queries to generate an expanded set of search queries that may include hundreds or thousands of search queries.

As will be understood by one skilled in the art, a variety of different algorithms and techniques are available for identifying search queries that are related to a given search query. In accordance with various embodiments of the present invention, any existing technology for identifying related queries may be employed to identify search queries related to the set of seed queries.

In some embodiments, the query expansion component 304 uses search engine session data to identify additional search queries that are related to the search queries in the set of seed queries. Any of a variety of different search engine session data may be employed in accordance with embodiments of the present invention. Generally, the search engine session data may include information regarding search queries that end users have submitted to a search engine, search results provided in response to the search queries, and search results users have selected (or "clicked") in response to submitted search queries. By way of example only and not limitation, the search engine session data may include search engine log files, query-click graphs, query histograms, search engine toolbar data, and web browsing data (e.g., logs of user behavior of users browsing web pages). Based on such search engine session data, related queries may be determined based on, for instance, identifying search queries submitted within the same search session of users. As another example, search queries that have resulted in similar search results may be identified as being related. Further, search queries may be identified as being related based on similar search results from the search queries having been selected by users in response to the search queries. As yet another example, random-walks of query-click graphs may be employed to identify related search queries. As known in the art, query-click graphs are typically bipartite graphs generated based on search engine session data in which nodes represent search queries submitted by users and search results (i.e., URLs) selected by users while edges between nodes identify search results that were selected by users in response to search queries. Again, the above-noted techniques for identifying related search queries are provided for illustrative purposes only, and embodiments of the present invention may employ any combination of a variety of techniques used to identify related search queries in order to expand the initial set of seed queries to an expanded set of search queries.

The URL watch list generation component 306 identifies URLs that are relevant to the given subject area. In some embodiments, URLs relevant to the given subject area are determined based on search queries. In some instances, the URL watch list generation component 306 may determine relevant URLs based solely on the set of seed queries from the seed query component 302. In such embodiments, the query expansion component 304 may be excluded. In other embodiments, the URL watch list generation component 306 may determine relevant URLs based on the expanded set of search queries from the query expansion component 304. The expanded set of search queries may include both the set of seed queries and the additional search queries determined by the query expansion component 304 to be related to the seed queries. In further embodiments, a set of seed URLs may be manually selected by an administrator of the aggregation service and provided to the URL watch list generation component 306. In such embodiments, the query expansion component 304, URL watch list generation component 306, and/or another component may expand the seed URLs to identify other relevant URLs. In further embodiments, the query expansion component 304, URL watch list generation component 306, and/or another component may operate on both a set of seed queries and a set of seed URLs to expand the seed queries/URLs and identify a set of relevant URLs for the URL watch list. Any and all variations are contemplated to be within the scope of embodiments of the present invention.

In accordance with various embodiments of the present invention, a number of different techniques may be employed to identify relevant URLs based on search queries. In some embodiments, the URL watch list generation component 306 may employ search engine session data to identify relevant URLs. As noted above, the search engine session data may include search engine log files, query-click graphs, query histograms, search engine toolbar data, and web browser data. Similar techniques for determining relatedness as discussed above for identifying related search queries by the query expansion component 304 may be employed by the URL watch list generation component 306 to identify relevant URLs. For instance, URLs that have been returned as search results for a threshold number of search queries from the set of search queries may be determined to be relevant. As another example, URLs that were selected by users from search results in response to a threshold number of search queries from the set of search queries may be determined to be relevant. In some cases, the top-ranked URLs from executing the search queries may be selected. Linking from social networks might also be employed to identify URLs of interest within a subject area. Social network users can be identified as interested in a subject area by examination of the plurality of the subject areas in their hyperlinks, or can be editorially identified as social network users who are publishers of subject area content. Links published by either set of identified users might then be added to a URL watch list for that subject area. One skilled in the art will recognize that a variety of techniques may be employed to identify relevant URLs based on a set of search queries.

Information regarding user browsing history may also be employed in some embodiments to determine relevant URLs. For instance, some users allow search engines to track a user's browsing history. Such information may identify some URLs as being highly related to other URLs that have already been determined to be relevant based on search engine session data. Additionally, web browsing information may assist in identifying which URLs are the most relevant to the given subject area.

The URL watch list generation component 306 generates a URL watch list that identifies URLs that are relevant to the particular subject area of interest. The information included in the URL watch list may include entire websites, portions of websites, and/or individual web pages. For instance, the URL watch list generation component 306 may determine that an entire website or a portion of the website is relevant to the particular subject area. In such cases, all URLs included in the entire website or portion of the website are included as part of the URL watch list. In some cases, however, individual web pages may be determined by the URL watch list component 306 to be relevant, and the URLs corresponding to those individual web pages are added to the URL watch list.

While embodiments of the present invention are directed to using a set of search queries to algorithmically identify relevant URLs, in some embodiments, editorial staff may also manually identify URLs as being relevant and add the manually-identified URLs to the URL watch list.

The aggregation server 300 also includes a crawler 308. The crawler 308 is operable to crawl the web pages and websites identified by the URL watch list generation component 304 to identify new content. In embodiments, the intervals at which the web pages and websites are crawled may be controllable. In particular, the web pages and websites may be crawled at intervals sufficient to identify new discussions in a timely fashion. In some embodiments, the crawler 308 may operate in a manner similar to that employed by traditional Web crawlers and span beyond the URL watch list alone. That is, the crawler 308 can follow additional links discovered in the document contents at URLs in the URLs watch list currently being crawled.

Because some URLs on the URL watch list may discuss multiple different subject areas, not all new content from the URLs will be within the subject area of interest. As such, new content identified by the crawler 308 is analyzed by the classifier component 310. The purpose of the classifier component 310 is to determine if the new content identified by the crawler 308 is within the particular subject area of interest. In other words, the classifier component 310 operates to filter out crawled content that is not relevant to the particular subject area of interest. For instance, continuing the example above in which the subject area of interest is "soccer," the URL watch list may include a web page that discusses multiple sports in addition to soccer. As such, the classifier component 310 operates over content crawled from the web page to identify content items that related to soccer while removing content items that relate to other sports.

In some embodiments, the classifier for the classifier component 310 is created by crawling URLs in the URL watch list to obtain content and using existing technologies to create a language model for the particular subject area of interest based on the content. By way of example only and not limitation, the classifier may be a linear classifier using N-gram features (e.g., unigrams, bigrams, trigrams, etc.), a decision-tree classifier using N-gram features, or a hidden Markov model using N-gram features. In some embodiments, the classifier may include non-N-gram features, such as signals from a social network (e.g., the system may identify that a particular user likes soccer and a particular web page, so the web page may be determined to be about soccer). The output of the classifier component 310 is unclustered content that has been identified as being relevant to the subject area of interest.

The cluster component 312 operates to cluster content items from the classifier component 310 that have been identified as being relevant to the particular subject area of interest. Each content item corresponds with a discussion of an event or topic from a URL on the URL watch list.

Clustering may be performed using a variety of techniques in embodiments of the present invention. In some embodiments, the cluster component 312 analyzes hyperlinks in the content items to identify linking relationships among the content items. This may be done, for instance, by analyzing a link graph in which nodes represent content items and edges between nodes represent hyperlinking in one content item to another content item.

In some embodiments, the cluster component 312 identifies one content item as the main discussion of a particular event or topic in the real-world. In some embodiments, a content item may be identified as the main discussion of the event or topic by identifying the content item as the original discussion of the event or topic based on publication dates/times of the various content items in the cluster and hyperlinks from other pieces of content to this particular content item. For instance, if content item B links to content item A, it's likely that content item B came after content item A and comments on the discussion of content item A. As a specific example, one content item may be the original story regarding an injury sustained by an athlete. Another content item may subsequently discuss the injury, hyperlinking to the original story, and provide more information such as when the athlete would be available to play again. In other embodiments, a content item may not be the original discussion of the event or topic but may be identified as the main content item based on the number of hyperlinks to the content item as compared to a number of hyperlinks to other content items within the cluster.

The cluster component 312 may employ other clustering techniques in addition to or as an alternative to link graph clustering. For instance, in some embodiments of the present invention, the cluster component 312 may employ ad hoc clustering in which the text of content items is analyzed to identify relationships among the content items. In some embodiments of the present invention, the time at which content items are published may be used for clustering. For instance, if two content items are published within close time proximity, it's more likely that the two content items are related. In further embodiments, a language model may be used to cluster content items.

Clustering performed by the cluster component 312 provides a number of event clusters within the particular subject area of interest. Each event cluster pertains to discussion of a particular event or topic within the subject area of interest. As noted above, one content item may be identified as the main discussion of the particular event or topic of an event cluster while other content items have been identified as commenting on or related to the main discussion. For instance, an event cluster may surround the results of a particular soccer match. One content item may be identified as the main discussion of the soccer match, while other content items in the cluster may be identified as commenting on the main discussion or as other discussions of that soccer match.

The ranking component 314 operates to rank the multiple event clusters against one another. A number of different ranking techniques may be employed by the ranking component 314 in accordance with various embodiments of the present invention. For instance, in some embodiments ranking may be performed at least in part based on the date and time of publication of content within each event cluster. The more recent publication of content items within an event cluster, the higher rank the event cluster will receive. In some embodiments, ranking may be based at least in part on the size of each event cluster (i.e., the size of an event cluster corresponding to the number of individual content items within the event cluster). The larger the cluster, the higher rank the cluster will receive. Event clusters may also be ranked based at least in part on the sources of content within each cluster. Each source may have a ranking associated with the source. Source ranking may be based on a variety of different factors, such as, for instance, end-user reviews, manual ranking by the editorial staff of the aggregation service, ranking based on the number of individual content items from a source, and ranking based on the number of hyperlinks to content items provided by a source. Ranking of event clusters may also be based in part on a number of content items published within a given time. For instance, if an event cluster contains a large number of content items that are published within a short period of time, the event cluster will receive a higher ranking. Search engine session data and user web browsing information may also be employed to rank clusters. In particular, information regarding the frequency with which users have selected URLs from search results and/or have visited URLs while web browsing may be used to rank event clusters.

In some embodiments of the present invention, the ranking component 314 may employ social network data in ranking the event clusters. User references on Internet social network sites to content items may be indicative that the content items are of particular relevance. For example, individuals using the TWITTER social network site may issue tweets about a particular event and include in the tweets links to URLs discussing that event. The presence of the hyperlinks in the tweets may be indicative that the particular event is popular and a cluster including discussions of that event should be highly ranked.

The social network data may be obtained from any number of social network sites, such as, for instance, the FACEBOOK, MYSPACE, and TWITTER social network sites. In some embodiments, the ranking component 314 identifies content from social network sites that hyperlinks to URLs corresponding with content items within event clusters. As such, the ranking component 314 uses the presence of hyperlinking from social network sites to URLs corresponding with content items within event clusters to rank the event clusters. In further embodiments, content from social network sites that hyperlink to URLs corresponding with content items within an event cluster are added to the event cluster. For instance, a reference to content from a social network site may be presented as part of an event cluster.

The aggregation server 300 also includes a user interface component 316 that facilitates user viewing of and interaction with ranked event clusters within various subject areas. In accordance with embodiments of the present invention, editorial staff of the aggregation service will select a variety of different subject areas. For each subject area, the editorial staff will manually generate a set of seed queries, which will be processed by the aggregation server 300 to generate ranked event clusters within each subject area (as discussed above). The user interface component 316 provides user interfaces that allows users to browse and/or search the various subject areas provided by the aggregation service in order to select a particular subject area. When a particular subject area is selected by a user, event clusters within that selected subject area are presented in accordance with the rankings determined for the various event clusters, for instance, by listing the event clusters in order from high ranking to lowest ranking. As such, the user may view the discussions about the latest interesting events and topics within that particular subject area. Each event cluster may be presented in the user interface with an identification of one or more content items within the event cluster and hyperlinks to the URLs corresponding with the one or more content items. Additionally, each event cluster may be presented in the user interface with a snippet describing the event or topic of the event cluster.

As noted above, some embodiments identify one content item as the main discussion of an event or topic and the other content items as subsequent and/or related discussions of that event or topic. In such embodiments, the user interface may present the event cluster in a manner such that the user may recognize the content item that has been identified as the main discussion of the event or topic. For instance, an event cluster may be presented in the user interface with a title and snippet from the main content item and only a title of other content items. A hyperlink to each original content item may be provided as part of the event cluster.

Figure 4:
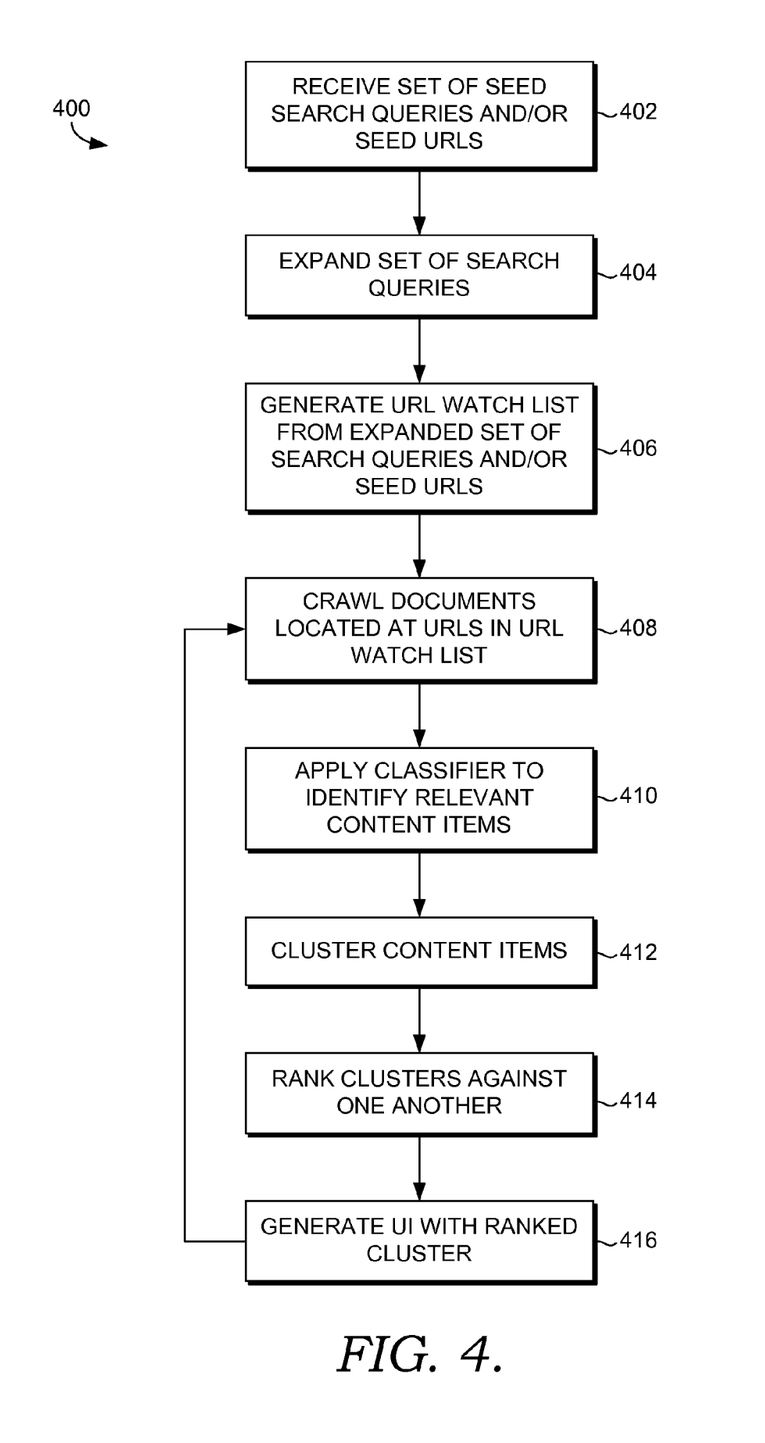
FIG. 4 is a flow diagram showing a method for aggregating web discussions of events and topics within a given subject area in accordance with an embodiment of the present invention.

Turning now to FIG. 4, a flow diagram is provided that illustrates a method 400 for aggregating web discussions of events and topics in a given subject area in accordance with an embodiment of the present invention. Initially, as shown at block 402, a set of seed search queries and/or a set of seed URLs is received. The set of seed search queries includes search queries that are manually determined, by the editorial staff of the aggregation service, to be relevant to the given subject area. In some embodiments, the set of seed search queries includes a small number of search queries. For instance, the set of seed search queries may include 10 or fewer search queries. In some embodiments, the set of seed search queries may be a single search query. The set of seed URLs includes URLs corresponding with documents the editorial staff believes to be relevant to the given subject area. The number of seed URLs in embodiments may range from a small number of URLs (e.g., a single URL) to any number of URLs.

If a set of seed search queries is received, as shown at block 404, the set of seed search queries is expanded to generate an expanded set of search queries in accordance with some embodiments. Query expansion may be performed using any of a number of different techniques in various embodiments of the present invention. In some embodiments, search engine session data may be used for query expansion. For instance, information regarding search queries that have been submitted to a search engine by users, search results provided by the search engine in return to the search queries, and/or search results returned by the search engine that have been selected by users may be used to identify search queries that are related to the seed search queries.

A URL watch list is generated based on the expanded set of search queries and/or seed URLs, as shown at block 406. In some embodiments, the expanded set of search queries is used to identify websites and web pages that are relevant to the given subject area. By way of example only and not limitation, search engine session data may be analyzed to identify URLs relevant to the expanded set of search queries. For instance, the search engine session data may be analyzed to identify URLs that have been returned as search results for a threshold number of search queries in the expanded set of search queries. As another example, the search engine session data may be analyzed to identify URLs that have been selected by users from search results for a threshold number of search queries in the expanded set of search queries. Other techniques, such as random walks of query-click graphs, may be employed to identify relevant URLs based on the expanded set of search queries. It should be understood by one skilled in the art that the above-described techniques for identifying relevant URLs based on the expanded set of search queries are provided for illustrative purposes only and other techniques for identifying relevant URLs based on the expanded set of search queries may be employed in various embodiments of the present invention. In further embodiments, browser session data may also be used to identify relevant URLs. The browser session data may include information identifying the browsing history of users showing the trail of web documents that users have viewed during browsing sessions.

In addition to or in lieu of using an expanded set of search queries, the generation of the URL watch list in some embodiments is based at least in part on a set of seed URLs. The URLs in the URL watch list may include the seed URLs. URL expansion may also be performed that identifies additional URLs related to the particular subject area based on the set of seed URLs. The URL watch list includes those identified additional URLs.

As shown at block 408, documents located at the URLs in the URL watch list are crawled. In some embodiments, documents that link to and/or are linked from the URLs in the URL watch list may also be crawled. By crawling the documents, content items are obtained. Each content item may correspond with the discussion of a particular event or topic. A classifier is applied to the content items at block 410 to identify content items that are related to the given subject area. For instance, although the URLs in the URL watch list have been identified as being relevant to the given subject area, in some cases, the URLs may include other content that is not relevant to the given subject area. As such, the classifier is used to identify relevant content items while removing content items that are not relevant to the given subject area.

After identifying relevant content items, the content items are grouped into various clusters, as shown at block 412. Each cluster may correspond with discussions surrounding a particular event or topic. A variety of different techniques may be employed to cluster content items in accordance with embodiments of the present invention. In some embodiments, hyperlinks in the content items are analyzed to generate the clusters. In particular, hyperlinking among content items is used to identify the content items as being relevant to one another. In some embodiments, a link graph, in which nodes represent URLs and edges between nodes represent hyperlinking from one URL to another, is employed for clustering. In embodiments, other techniques may be employed for clustering purposes. For instance, some embodiments may employ ad hoc clustering, in which content items are clustered based on textual analysis such that content items containing similar text are grouped together. In further embodiments, time of publication of content items may be employed for clustering purposes.

The clusters are ranked against one another, as shown at block 414. Cluster ranking may be performed using a number of factors for ranking purposes. In some embodiments, cluster ranking is based at least in part on the presence of social network data that hyperlinks to URLs in the clusters. Other factors that may be used for cluster ranking purposes include: date and time of publication of content items within each event cluster; the size of each cluster; the sources of content within each cluster; number of content items published within a given time; search engine session data; and user web browsing information.

As shown at block 416, a user interface is generated that includes clusters for the given subject area. The clusters may be included in the user interface based on the cluster ranking. Clusters likely to be more popular based on the ranking are included in more prominent locations within user interface. For instance, clusters may be listed in the user interface based on the cluster ranking.

In embodiments of the present invention, the process of generating clusters of web discussions of events and topics described above with reference to blocks 402 through 414 may be performed for a variety of different subject areas. In such embodiments, user interfaces may be generated that allow users to browse and select from the different subject areas. When a user selects a particular subject area, the user views a user interface that includes clusters for the selected subject area. In embodiments, each cluster within the user interface includes hyperlinks to one or more of the discussions included in the cluster.

As shown by the return from block 416 to block 408 in FIG. 4, the URLs in the URL watch list are crawled at given intervals identifying new content items, and the process of clustering content items is repeated. As such, the most recent discussions of events and topics within a given subject area may be identified, clustered, ranked, and provided to end users.

As can be understood, embodiments of the present invention provide an aggregation service that identifies web pages relevant to a given subject area based on a set of seed search queries and clusters discussions of events and topics from those web pages. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform a method comprising:
receiving an initial set of search queries including one or more input search queries, the one or more input search queries having been manually determined to be relevant to a given subject area;
generating an expanded set of search queries by analyzing search engine session data to identify a plurality of additional search queries related to the one or more input search queries, the expanded set of search queries including the one or more input search queries and the plurality of additional search queries;
employing the expanded set of search queries to identify a plurality of URLs relevant to the given subject area, each URL in the plurality of URLs associated with a website, wherein employing the expanded set of search queries to identify the plurality of URLs relevant to the given subject area comprises analyzing search engine session data and user web browsing data based on the expanded set of search queries to identify the plurality of URLs;
determining for each URL in the plurality of URLs a section of the website that is relevant to the given subject area;
periodically crawling, based on the section identified for each URL, documents associated with the plurality of URLs, to provide a plurality of content items from the URLs;
employing a classifier to identify relevant content items from the plurality of content items, the relevant content items being determined by the classifier to be relevant to the given subject area;
clustering the relevant content items into a plurality of clusters, each cluster including a group of content items associated with a particular event or topic within the given subject area, wherein the particular event or topic is associated with a main content item identified based on the number of hyperlinks in the relevant content items to the main content item;
ranking the plurality of clusters against one another, wherein ranking comprises:
(1) retrieving content from social network sites;
(2) counting within the content from social network sites the number of hyperlinks to URLs corresponding with the relevant content items within the plurality of clusters; and
(3) ranking a first cluster higher than a second cluster when the first cluster has more hyperlinks than the second cluster; and
generating a user interface allowing a user to view and interact with the plurality of clusters, wherein the user interface provides, for each cluster, the main content item and a plurality of related content items, wherein the plurality of related content items comprises the content from social network sites having hyperlinks to URLs corresponding with the relevant content items.

2. The one or more computer storage media of claim 1, wherein the section of the website includes a website entirety, a portion of the website, or an individual page of the website.

3. The one or more computer storage media of claim 1, wherein the plurality of URLs relevant to the given subject area are further identified by analyzing linking from social networks.

4. The one or more computer storage media of claim 1, wherein the classifier is created by crawling at least a portion of the URLs to obtain content and generating a language model for the given subject area based on the content.

5. The one or more computer storage media of claim 4, wherein the classifier comprises at least one of the following: a linear classifier using N-gram features; a decision-tree classifier using N-gram features; and a hidden Markov model using N-gram features.

6. The one or more computer storage media of claim 1, wherein clustering the relevant content items into the plurality of clusters is further based at least in part on ad hoc clustering in which text of the relevant content items is analyzed to identify relationships among the relevant content items.

7. The one or more computer storage media of claim 6, wherein clustering the relevant content items into the plurality of clusters is further based at least in part on time of publication of the relevant content items.

8. The one or more computer storage media of claim 1, wherein ranking the first cluster higher than the second cluster is further based at least in part on one or more selected from the following: time of publication of the relevant content items; size of each cluster; ranking of sources of each relevant content item; search engine session data; and user web browsing information.

9. The one or more computer storage media of claim 1, wherein the each of the content items retrieved from the social network sites having hyperlinks to URLs corresponding with the relevant content items within the plurality of clusters is further added to a corresponding cluster in the plurality of clusters.

10. The one or more computer storage media of claim 1, wherein the main content item for at least one cluster is identified by analyzing time of publication of each content item in the at least one cluster and hyperlinking relationships among the content items within the at least one cluster.

11. The one or more computer storage media of claim 1, wherein the method further comprises adding, to at least one cluster, a reference from a social networking site that hyperlinks to at least one URL in the at least one cluster.

12. The one or more computer storage media of claim 1, wherein the method is repeated for a plurality of subject areas.

13. One or more computer storage media storing computer-useable instructions that, when used by one or more computing devices, cause the one or more computing devices to perform a method comprising:
  receiving a plurality of seed URLs manually determined by an administrator of an aggregation service to be relevant to a given subject area; wherein the plurality of seed URLs are associated with manually identified social network users interested in the given subject area;
  identifying a plurality of URLs based at least in part on the plurality of seed URLs, each URL in the plurality of URLs associated with a website;
  crawling documents corresponding with the plurality of URLs to identify content items from the documents relevant to the given subject area;
  clustering the content items into a plurality of clusters; and
  ranking the plurality of clusters against one another, wherein ranking the plurality of clusters against one another comprises:
    (1) retrieving content from social network sites;
    (2) counting within the content from social network sites the number of hyperlinks to URLs corresponding with the relevant content items within the plurality of clusters; and
    (3) ranking a first cluster higher than a second cluster when the first cluster has more hyperlinks than the second cluster.

14. The one or more computer storage media of claim 13, wherein identifying the plurality of URLs is further based at least in part on additional search queries determined to be related to the plurality of seed search queries.

15. The one or more computer storage media of claim 13, wherein clustering the content items into a plurality of clusters comprises employing hyperlinking contained in content items to identify relationships among the content items.

16. The one or more computer storage media of claim 13, wherein ranking the plurality of clusters against one another comprises generating a ranking for each cluster, and wherein the ranking for at least one cluster is based at least in part on presence of a hyperlink in social network data from a social network site to at least one content item in the at least one cluster.

17. The one or more computer storage media of claim 16, wherein the method further comprises adding, to the at least one cluster, a reference to the social network data from the social networking site that hyperlinks to the at least one content item in the at least one cluster.

18. A method performed by one or more computing devices to identify and cluster web discussions that are relevant to a selected subject area, the method comprising:
  identifying, by a first computing process, a plurality of web pages relevant to the selected subject area based on a plurality of search queries manually determined to be relevant to the selected subject area, wherein the plurality of web pages are associated with manually identified social network users interested in the given subject area;
  identifying, by a second computing process, discussions on the plurality of web pages that are relevant to the selected subject area;
  clustering, by a third computing process, the discussions into a plurality of clusters, each cluster including a group of discussions regarding a particular topic or event, wherein the first, second, and third computing processes are performed by the one or more computing devices; and
  ranking the plurality of clusters against one another, wherein ranking the plurality of clusters against one another comprises:
    (1) retrieving content from social network sites;
    (2) counting within the content from social network sites the number of hyperlinks to URLs corresponding with the relevant content items within the plurality of clusters; and
    (3) ranking a first cluster higher than a second cluster when the first cluster has more hyperlinks than the second cluster.

19. The method of claim 18, wherein clustering the discussions into a plurality of clusters comprises employing hyperlinking contained in the discussions to identify relationships among the discussions.

20. The method of claim 18, wherein ranking the first cluster higher than the second cluster is further based at least in part on one or more selected from the following: time of publication of the relevant content items; size of each cluster; ranking of sources of each relevant content item; search engine session data; and user web browsing information.

* * * * *